United States Patent [19]
Alvarez-Calderon

[11] 3,917,192
[45] Nov. 4, 1975

[54] FLAP MECHANISMS AND APPARATUS

[76] Inventor: Alberto Alvarez-Calderon, Avenida Salaverry 3465, Orrantia del Mar, Lima, Peru

[22] Filed: Dec. 10, 1973

[21] Appl. No.: 423,012

Related U.S. Application Data

[63] Continuation-in-part of Ser. No. 377,621, July 9, 1973, Pat. No. 3,897,029.

[52] U.S. Cl. ........................... 244/42 D; 244/42 DB
[51] Int. Cl.² ........................................... B64C 9/26
[58] Field of Search ......... 244/42 R, 42 CA, 42 CB, 244/42 D, 42 DA, 42 DB, 44

[56] References Cited
UNITED STATES PATENTS

| | | | |
|---|---|---|---|
| 1,472,199 | 10/1923 | Thomson | 244/42 CA |
| 3,333,791 | 8/1967 | Alvarez-Calderon | 244/42 D |
| 3,363,859 | 1/1968 | Watts | 244/42 CA |
| 3,504,870 | 4/1970 | Cole et al. | 244/42 R |
| 3,524,610 | 8/1970 | Alvarez-Calderon | 244/42 R |
| 3,556,439 | 1/1971 | Autry et al. | 244/42 D |

Primary Examiner—Trygve M. Blix
Assistant Examiner—Barry L. Kelmachter
Attorney, Agent, or Firm—Limbach, Limbach & Sutton

[57] ABSTRACT

Flap actuator mechanism to move flap members of a double slotted leading edge flap in opposite directions during flap extension, with the forward flap moving by large angular displacement and the rear flap moving by a small and opposite angular displacement. An embodiment of the flap actuator mechanism is movable from a spanwise direction to retract flaps, to a chordwise direction to extend flaps.

6 Claims, 9 Drawing Figures

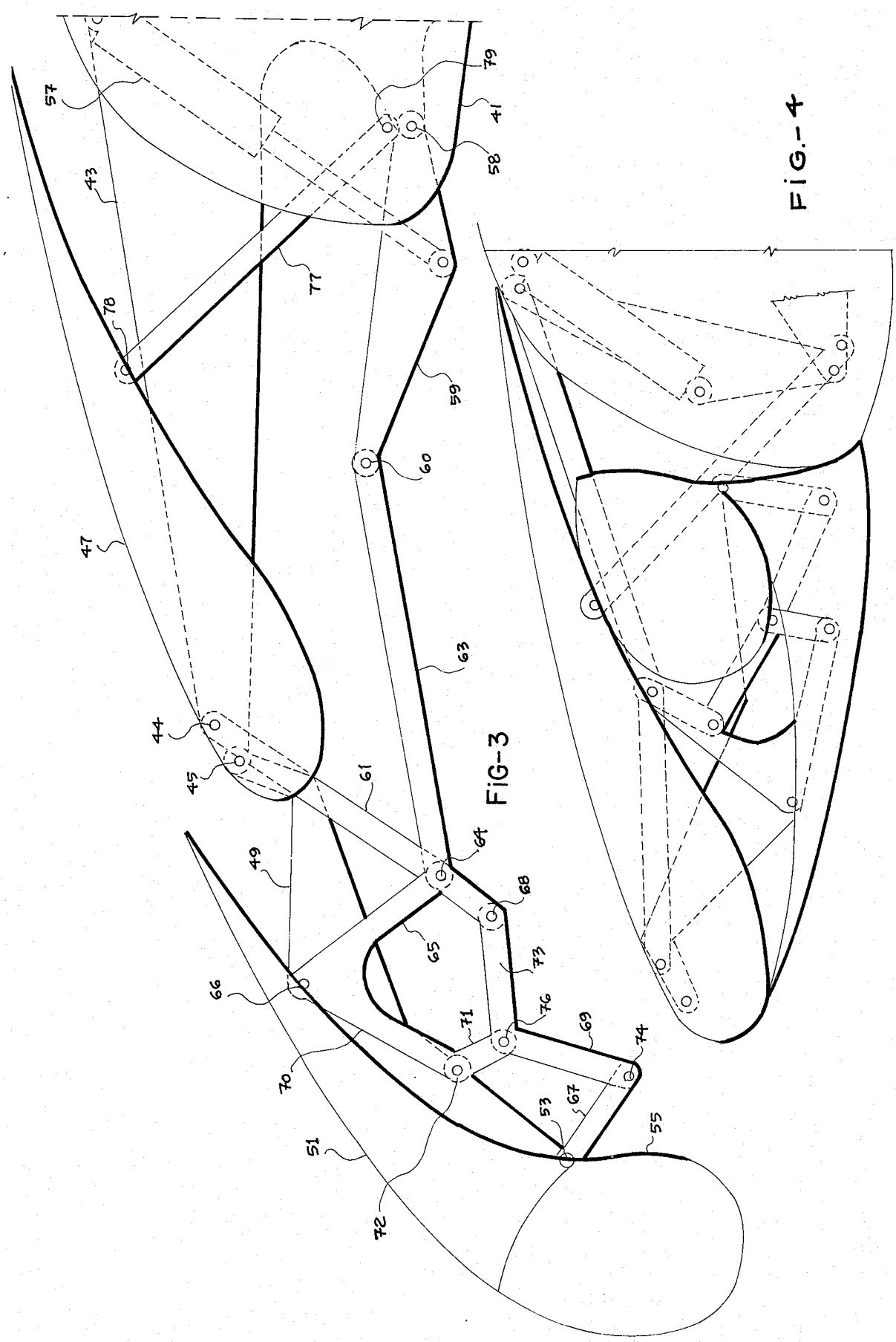

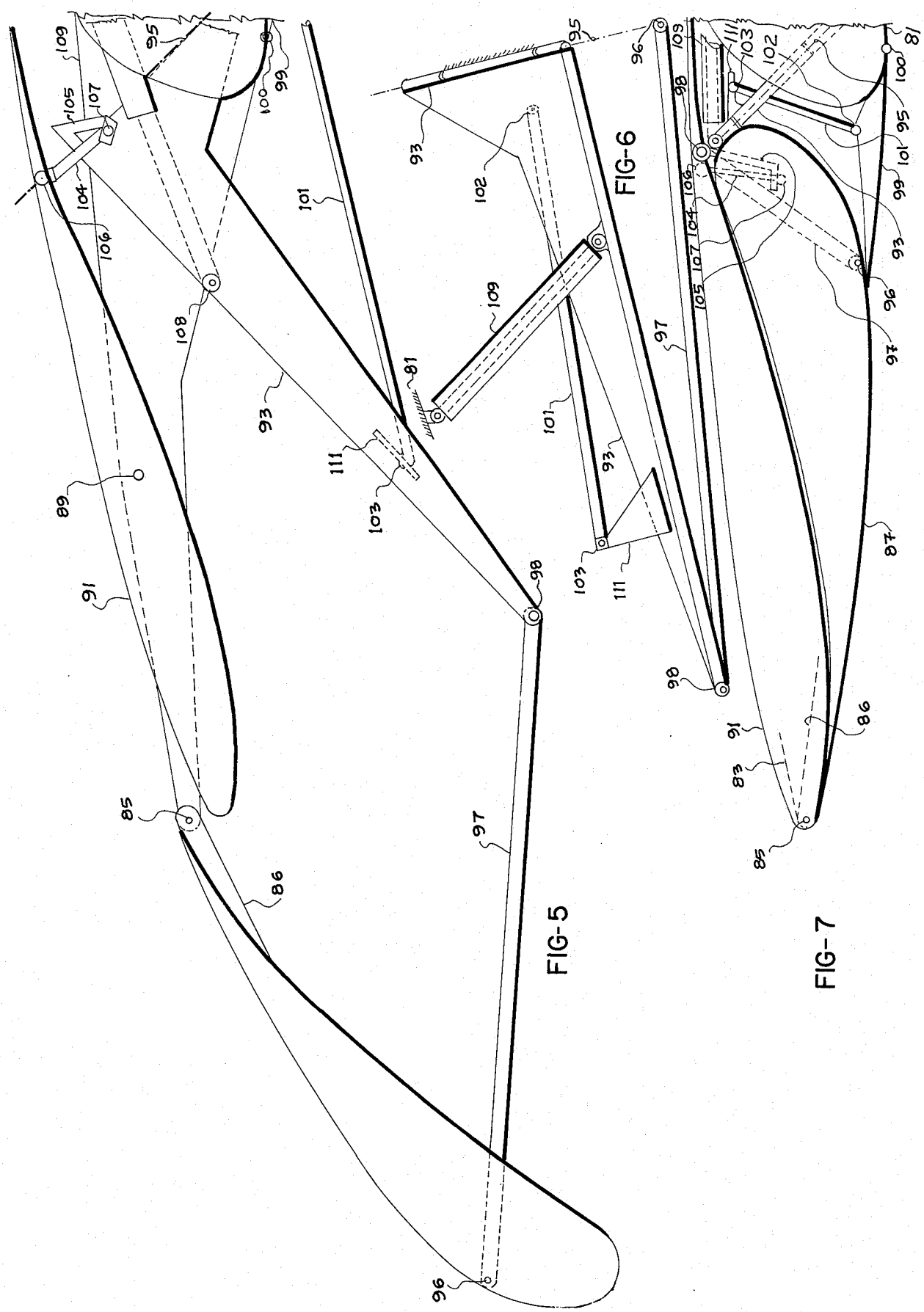

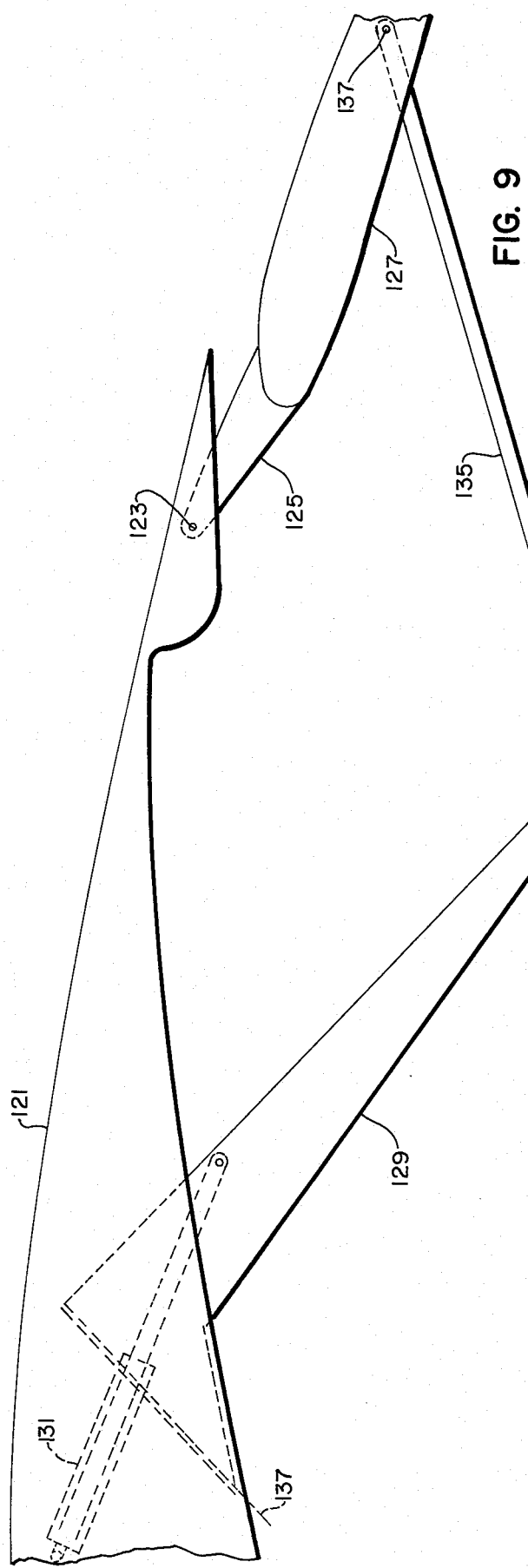
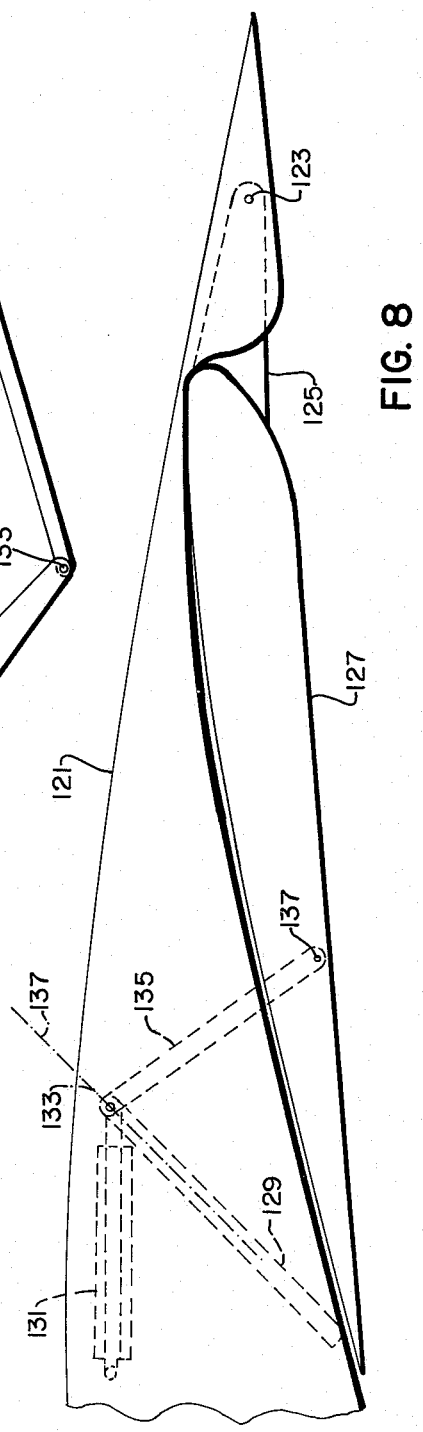

FLAP MECHANISMS AND APPARATUS

This application is a continuation-in-part of application Ser. No. 377,621, filed July 9, 1973, now U.S. Pat. No. 3,897,029.

SUMMARY OF THE INVENTION

The present invention provides simple efficient actuating devices to move leading edge flaps of the kind mentioned in my above patents and patent applications; evidently the mechanisms shown in this applicatable to move inverting flaps of the kind shown in my U.S. Pat. No 3,126,173, and to move Krueger type of leading edge flaps in general.

One purpose of my invention is to define a mechanism having as an output angular flap motion of the order of 150° with relatively small angular input in the mechanism, in the order of 90°, by means of an axially extendable actuator rotating a bellcrank, or by means of a powered hinge acting on the mechanism.

Another purpose of my invention is to provide a flap actuator having exceptional stiffness, by means of structurally determinate mechanism and relatively low link and actuator loads.

Yet another purpose of my invention is to provide such actuators having greatly reduced and minimun volume in the retracted position.

One more purpose of the invention is to provide actuation structures and mechanisms the orientation of which shifts from the spanwise to the chordwise direction, thus requiring minimum stored volume within the space available on thin wings.

Another purpose of the invention is to define an actuator for flap pairs in which actuator loads due to air loads of one flap tend to be relieved by actuator loads due to air loads of the related flap, or in a related flap door.

Yet another purpose of my invention is to provide in a flap pair preselected and coordinated angular motion of one flap in response to the position of another flap, using only one powered actuator, with links connecting both flaps.

Yet one more purpose of my invention is to move efficiently foldable nose portions of my leading edge flap consequent to the motion of the leading edge flap away from the wing.

BRIEF DESCRIPTION OF DRAWINGS.

The drawings diagramatically show, by way of example and not of limitation, forms of the invention wherein numerals designate parts in several views in which:

FIGS. 3 and 4 have the same contours and flap designs as in FIGS. 1 and 2, but show alternate mechanisms also in a chordwise plane, in which bellcranks play a less important role in favor of greater number of links.

FIGS. 5, 6 and 7 show a uouble slotted leading edge flap on a thin wing in which a special actuator is designed to be oriented in a spanwise direction when retracted and in a chordwise direction when extended, with a special device to move a door fairing as the lower flap is extended.

FIG. 8 shows the type of actuator of FIG. 7 applied to a trailing edge flap of the inverting kind, in the extended position. FIG. 9 shows the flap of FIG. 8 in the retracted position.

DESCRIPTION OF PREFERRED EMBODIMENTS.

In this invention I teach generic and specific configurations for my actuators, their proportions, shapes and orientations, and their geometric, kinematic and energetic description.

My invention is not limited to its application to the individual drawings and descriptions; the invention is capable of other embodiments and of being applied in various other ways.

Figure 1:
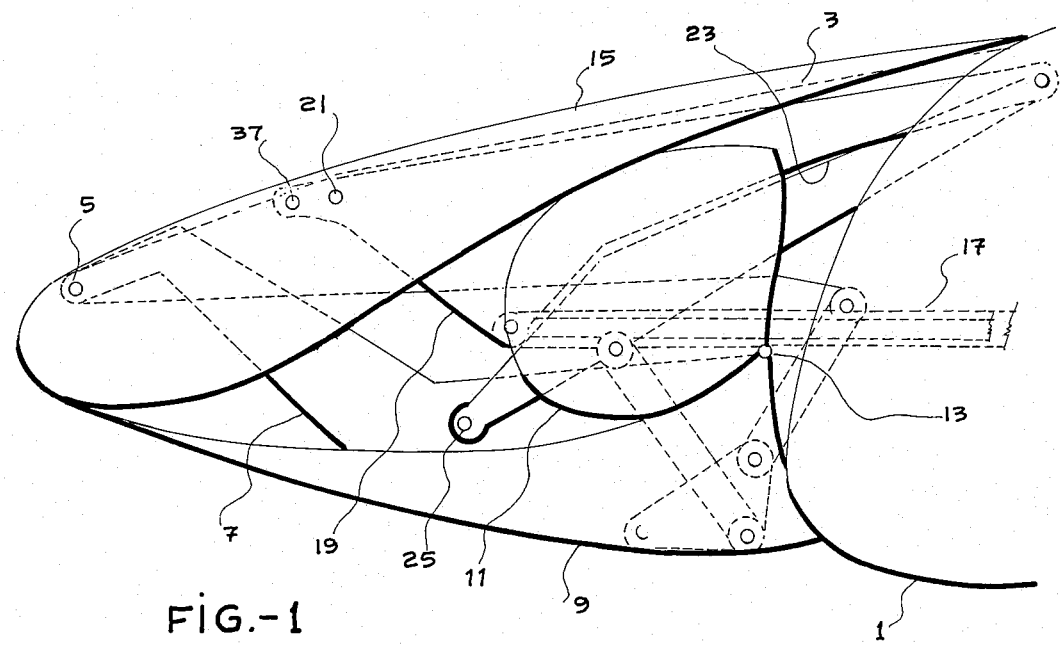
FIG. 1 and 2 show in the retracted and extended position, and on the nose portion of a medium thick wing, a sectional view of my double slotted leading edge flap having a foldable nose and a single actuator capable of extending the lower flap, raising the upper flap, and moving the foldable nose as required, using a mechanism comprising two bellcranks and various links in a chordwise plane.

FIG. 1 shows main wing structure 1 on which there is a protruding bracket 3 which connects at axis 5 to chordwise support 7. The latter support is fixedly attached to lower flap member 9 shown retracted in FIG. 1.

Member 9 has an articulated nose portion 11 hinged at hinge 13.

On bracket 3 there is also supported upper flap member 15, in this instance also at axis 5, but it could be supported at a different axis.

The actuation mechanism will be specified firstly in connection to the lower flap member, and then to the upper flap member.

Hydraulic piston or jackscrew 17 is attached at one end (not shown) to structure 1 and at its other end to bellcrank 19 which is hinged at pivot 21 on bracket 3.

Link 23 extends between the end of bellcrank 19 which is away from axis 21, to a connection in support 7 shown as pivot 25, located between axis 5 and hinge 13.

Extension of 17 rotates bellcrank 19 about axis 21, which in turn displaces link 23 in order to rotate lower flap member 9 about axis 5, by an angle considerably larger than the angle by which bellcrank has been rotated. This angular multiplying effect is most advantageous, because efficient jackscrew action on a bellcrank is generally limited to about 90°, whereas the angular rotation required for lower flap member is on the order of 150°. The extended position is shown in FIG. 2.

Figure 2:
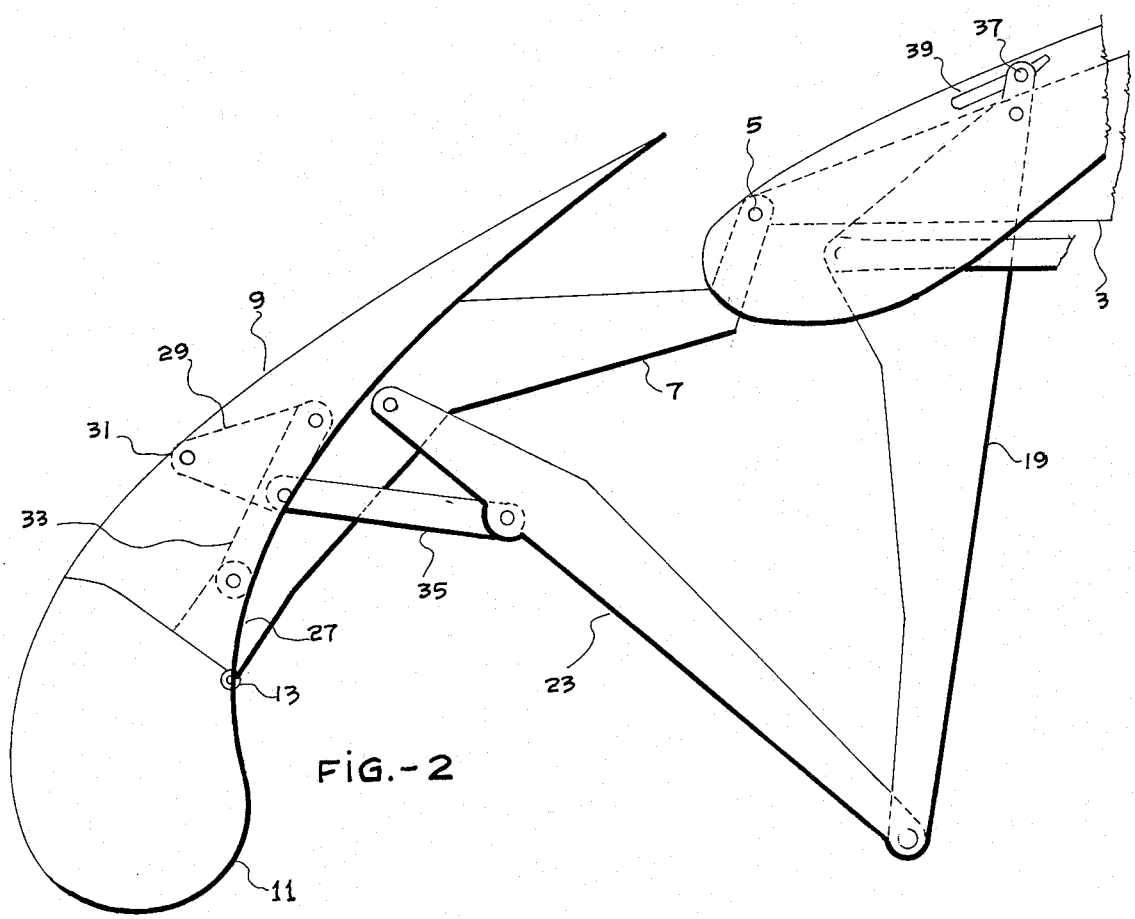

In FIG. 2, there is shown how position of nose 11 is determined with respect to 9.

Indeed, nose 11 has a horn 27, and member 9 has a second bellcrank 29 pivoted at 31 on 9.

Between the end of second bellcrank which is away from its support pivot 31, and the end of the horn, there extends a second link 33.

Between another place of the bellcrank 29 and first link 23, there extends a third link 35.

Evidently by inspection of FIGS. 2 and 1, and by virtue of relative position of points of articulation of links and bellcranks and their dimension, it is evident that counterclockwise angular displacement of link 23 with respect to 9, drives second bellcrank 29 also counterclockwise; however, second link 33 rotates nose 11 in a clockwise manner with respect to 9 throughout most of angular displacement of 9 under the action of 23.

Notice, however, that at the very beginning of motion in FIG. 1, counterclockwise displacement of second bellcrank 29 also produces a small counterclockwise displacement of nose 11: this is advantageous such that folded nose 11 clears upstream of structure 1 as lower flap begins to rotate about axis 5 under the action of link 23, driven by bellcrank 19 which in turn is rotated about pivot 21 under action of piston 17.

So far we have shown an ingenious and novel way to multiply angular motion of bellcrank 19 efficiently restricted to about 90°, to a substantially larger yet mechanically efficient angular motion of lower flap 9 by about 150°, with the structure being rigid and of low forces by means of the relatively large distance between line of action of forces in piston and first link, and points of rotation of flap member and wing. Also I have shown an ingenious and novel way to rotate nose 11 with respect to flap 9 by about 180° by means of an additional bellcrank and additional links, driven by the first link, inclusive a unique reversal of angular direction of rotation at the beginning of extension of flap 9, without the need of a second actuator for nose of 9.

I shall now review in FIGS. 1 and 2 how I cause that actuation of piston 17 also moves upper flap member 15: note that first bellcrank 19 in FIG. 1 has a horn extending outward in the vicinity of axis 21, with a lateral pin 37. As shown in FIG. 2 flap 15 is in the high lift landing position and displaced slightly counterclockwise with respect to FIG. 1, to offer a second slot (not shown in this figure but shown in FIG. 3) between trailing edge of flap 15 and upper surface of structure 1. The position of flap 15 is defined by the upward displacement of pin 37 and its lifting flap 15 by virtue of the engagement of pin 37 in cam 39. It is evident by inspection from FIG. 2, that counterclockwise rotation of bellcrank 19 with respect to wing, will cause pin 37 to slide forward on cam 39 and close upper flap 15 to position shown in FIG. 1.

It is also evident by inspection of FIG. 2 and most important, that further clockwise motion of bellcrank 19, as is required to make flap 9 assume a shallower angle advantageous for take-off or climb, would also cause flap 15 to reduce and finally close its rear slot, to a climb position having only one slot, namely that between trailing edge of 9 and leading edge. Note here that small clockwise additional displacement of bellcrank 19 causes small effect on position of nose 11 with respect to flap 9, but a large effect in closure of second slot, by virtue of upward steepness of cam 39 at its rearward end.

We have now completed the description of mechanisms of FIG. 1 and 2, in which (a) a single actuating piston 17 is shown (b) capable of efficiently driving a lower flap member 9 by about 150° or more (c) together with a programmed automatic rotation of nose 11 with respect to 9 through about 180° inclusive angular reversal at the beginning of extension of 9 and small angular displacements near the end of extension of 9, and (d) simultaneously causing flap 15 to open a second slot by a few degrees of motion (about 5°) as lower flap opens to about 150°, (e) with inherent closure of flap 15 as lower flap 9 is further extended to a shallower position, (f) noting also how loads on pin 37 due to flap 15 tend to relieve piston loads near the closure of flap 9.

I will now show the mechanisms of FIGS. 3 and 4.

FIG. 3 shows a wing 41 from which there extends a bracket 43 on which at axis 45 there is supported an upper flap member 47 shown raised in a high lift position, with its trailing edge portion being spaced from wing 41 to define slot walls of a second slot therebetween, of the kind shown also in my U.S. patent application Ser. No. 377,621.

Supported by bracket 43 — in this example also at axis 45 but could be at another axis — there is shown support 49 which supports a lower flap member 51, shown extended in a high lift position in which its trailing edge is spaced from the leading edge of 47 to define the contracting walls of a first high lift slot.

On flap member 51 there is shown connected at hinge 53 a foldable nose portion 55, shown in FIG. 3 extending the chord and camber of 51.

The actuator system for my flaps is described as follows.

Axially extendable hydraulic piston or jackscrew 57 is shown connected at its upper end to bracket 43, or it could be connected to wing 3, near upper surface of wing 3. At another end 57 is connected to a mid portion of first bellcrank 59. The bellcrank is pivoted at one end to bracket 43 at axis 58, but it could be pivoted to wing 41, near the lower surface of wing 41. At the other end of 59, there is shown pivot 60 on which first link means 63 is connected.

Near the opposite end of 63, at hinge 64, there is shown lower end of second link 61 which at its upper end is hinged at 44 on bracket 43, somewhat to the rear of hinge 45.

Evidently, extension of 57 causes hinge 64 to describe a circle around hinge 44, which keeps a large perpendicular distance between link 63 and axis 45, thereby causing permanent stiffness and reducing loads.

Pivot 64 is connected to lower flap bracket 49 by means of upper arm of bellcrank or connection 65, which arm pushes in and out lower flap member as pivot 64 displaced on its circular path by 63. Note that link 63 protrudes beyond hinge 64 to support axis 68, for reasons explained hereafter.

Folding nose portion 55 must be driven to a folded position on top flap 51 as flap 51 is retracted, and a separate power device is avoided in my design by means of a simple linkage mechanism described as follows.

Folding nose 55 has a fixed horn 67.

Second bellcrank on 49 has lower arm 70 with a pivot 72 at its end. Remember that second bellcrank is driven by first link 63. Pivot 72 thus describes an arc about 66.

Connecting the outward end of horn 67 at pivot 74, there is shown third link 69 which is also connected at pivot 76 to fourth link 71.

Now evidently 71 and 69 by themselves cannot define an angular position to nose 55. Therefore a fifth link 73 is incorporated connecting pivot 76 and pivot 68. Now as 68 forms a part of first link 63 it has always a determined position in space, hence position of end 68 of link 73 is defined, and this in turn defines position of 76 and consequently, position of nose 55.

By virtue of the relative position, orientation, sizes, and location of the hinge points of my design, as evident in FIGS. 3 and 4, axial contraction of powered device 57 from position shown in FIG. 3 will cause angular motion to retract flap 51, with folding nose 55 moving gradually to a position on top of 51 is fully retracted as shown in FIG. 4.

I will now describe how the upper flap 47 is moved in coordination with motion of lower flap 51.

On bellcrank 59 there is shown, adjacent and eccentric to its axis of rotation 58, a separate pin connection 79, to which there is attached the lower end of sixth link 77 connected at its upper end to flap 47 at hinge 78.

As shown in FIG. 3, link 77 is raising flap 47 about axis 45 to define the downstream slot. Clockwise rotation of bellcrank 59 to position shown in FIG. 4 evidently closes flap 47 to the high speed position.

A different location of hinge 79 displaced slightly more towards end 60 would cause flap 47 to open when 51 reaches a steeper position, and close again as 51 is moved further forward to a shallower position.

An alternative drive system for my system of FIG. 3 is to replace piston 57 and bellcrank 59 with a powered hinge acting with its axis of rotation at a location similar to 58, with a horn attached to it to provide support for hinge 60.

The structure specified above is shown capable of providing simultaneous coordinated angular motion to lower flap 51 by about 150° relative to flap 51; and upper flap 47 by a few degrees relative to structure 41, between a retracted smooth low drag position and a double slotted high lift position in which the nose of the flap 51 is extended in chord and camber, and flap 51 extend the camber and chord of wing 41.

Thus far I have specified actuators on medium thick wings in the order of 12% thick, in which depth is available to house such actuators to operate in approximately vertical planes aligned in a chordwise orientation approximately perpendicular to the axis of rotation of the flaps, although in swept wings the angle of orientation may be varied somewhat away from the perpendicular direction.

As the wing section becomes thinner, then the kind of actuator shown in FIGS. 1 to 4 becomes more difficult to place within the wing contours while retaining the same advantageous leverages and stiffness in the mechanism.

I am, therefore, showing actuators for thin wings in FIGS. 5, 6 and 7, in which special features are provided as specified hereafter.

FIG. 5 shows an upstream wing structure 81 which has a forwardly extending bracket 83 on which at hinge 85 there is mounted, with support 86, a lower leading edge flap 87, having very large camber and nose radius.

A door fairing 99 is provided between structure 81 and a portion of flap 87, with the door being hinged at hinge 100°. This door must be opened in order to permit extension of 87, and closed to conform to a low drag high speed disposition.

Now on bracket 83 there is mounted upper flap 91 at axis 89. When upper flap is shown in position of FIG. 5, it opens two slots, one between leading edge of upper flap 89 which is moved below trailing edge of extended lower flap 96, and the other slot between trailing edge of upper flap 91 which is elevated and spaced from upper surface of wing 81.

I shall now describe my actuator system for the various flaps and door.

Lower flap 87 is moved as follows: on wing 81 there is shown hinge axis 95 located in a plane approximately in a chordwise direction, with axis 95 being inclined forwardly by an angle of the order of 45° from the vertical, as seen in FIG. 5.

On axis 95 there is shown mounted a bellcrank 93 which in the retracted position has its body with a special orientation extending approximately in a spanwise direction, and hence seen edgewise in FIG. 7. FIG. 6 shows the special bellcrank as seen from above, in which 81 shows the spanwise direction.

End 98 of special bellcrank 93 includes a universal joint or swivel axis to which there is attached one end of connecting link 97; the other end of 97 is articulated at universal joint or swivel axis 96 on flap 87.

Rotation of bellcrank 93 about axis 95 under action of piston or jackscrew 109 displaces end 98 in an arc in a special plane perpendicular to axis 95 and thereby through action of link 97, causes flap 87 to emerge gradually at full extension of piston 109, positions shown in FIG. 5 is reached, with bellcrank 93 seen approximately in its plan view in FIG. 5 and approximately in a chordwise direction. When 97 and 93 are in the same plane, aerodynamic loads are no longer acting on piston 109, a special and stable condition for the mechanism.

An important and special feature of this design is how the retraction mechanism and structure for flap 87 lies in the retracted position nearly entirely in a spanwise direction (FIG. 4) within the small space between wing 81 and flap 87. Yet this mechanism is capable of projecting angular motion to flap 87 in the range of 150° with a rotation of the bellcrank 93 about axis 95 of only about 90° with adequate stiffness and low loads.

I will now show how to open door fairing 99 without need for a separate powered actuator, but only by means of a single link. The problem is not simple, as the 90° rotation of special bellcrank 93 must provide approximately 180° rotation of the door in a different plane, with the further complication that the rate of angular extension of door 99 must be initially very fast to permit emergence of nose of flap 87. This I have solved with if I may say so the elegance and simplicity which characterizes my best inventions, as is described as follows:

The simplest solution to the problem above would be the use of a single link between existing bellcrank 93 and door 99.

That a single link can, in theory, perform such requirement as 180° rotation with varied angular rate is not easy to show. The mathematical solution to prove the existence of such a link is extremely complex, yet the link solution I have shown in FIG. 4 to 6 works experimentally: On special bellcrank 93 there is located a special rigid support III at the end of which there is univeral joint or swivel 103 connected to one end of my connecting link 101. The other end of connecting link 101 is attached at universal joint or swivel 102 to door 99.

The position of link 101 is shown retracted in FIGS. 7 and 6 with door closed in FIG. 7 (door not shown in FIG. 6) and is shown extended in FIG. 5 with door in a trailing open position.

Note here that aerodynamic loads on door act on mechanism to relieve it from aerodynamic loads of flap 87, which is a special cooperation of parts of my design tending to decrease power required from actuator 109.

I shall now describe how flap 91 is moved about axis 89 without need of a separate powered device. A protruding arm of bellcrank 93 extends across hinge 95 as shown in FIG. 5 and with the arm also oriented downwards as shown in FIG. 4 (not shown in FIG. 6 for clarity of FIG. 6).

At lower end of arm 105 there is shown swivel joint or univeral joint 107 to which there is attached a third link 104 the other end of which is connected at universal joint 106 to flap 91.

Downward angular motion of bellcrank 93 elevates arm 105 which in turn elevates trailing edge of 91 about axis 81 to define both front and rear slots.

It has been shown how efficient rotation of about 90° in my bellcrank 93 create, by means of three links, specified and critical motion to lower flap by about 150°, to door by about 180°, and to upper flap by a few degrees.

Bellcrank 93 is shown moved by piston or jackscrew 109, but 109 could be replaced by a powered hinge at axis 95.

FIGS. 8 and 9 show the retraction mechanism of FIGS. 5 to 7 applied to a trailing edge flap of the inverting kind.

Specifically, FIG. 8 shows rear wing portion 121 which at axis 123 supports inverting flap 127 by means of bracket 125.

Actuator comprises arm 129 shown extended in an approximately chordwise plane and hinged at axis 137.

At end of 129 there is connected at universal joint 133 a link 135 which engages flap 127 at swivel joint 137.

Axial contraction of piston 131 rotates arm 129 about axis 137 to a spanwise orientation shown edgewise in FIG. 8. Evidently displacement of joint 133 also causes flap 127 to be pulled in by link 135, to position shown in FIG. 8.

I claim:

1. A wing having a leading edge portion; a double slotted leading edge flap having a lower member mounted adjacent said leading edge portion and adapted to be rotated from a retracted position below said leading edge portion, in a downwardly and forwardly manner to an extended position extending the chord and camber of said wing; an upper member located above said lower member with said upper member having its trailing edge adapted to be moved in an upward direction, when said lower member is moved to said extended position; actuating means to move said leading edge flap members comprising: (a) bellcrank means articulated on said wing adjacent said leading edge portion of (b) powered means to move said bellcrank means; (c) link means connected at one end on said bellcrank means at a location away from said articulation, with said link means connected at another end to said lower flap member; (d) connecting means engaging at one end said upper flap member and at another end engaging said bellcrank means at a location adjacent said articulation; (e) said powered means moving said bellcrank means causing said link means to move said lower flap member in a first angular direction by a large angle of the order of 150° from said retracted position to said extended position; and causing said connecting means to move said upper flap member in a second angular direction opposite to said first angular direction by a small angle of the order of 5° thereby moving the trailing edge of said upper member away from the adjacent surface of said leading edge portion when said lower member is moved to said extended position.

2. The structure of claim 1 further characterized in that when said bellcrank means is rotated to move said lower flap further forward from said extended position, said connecting means lower the rear portion of said upper member towards the upper surface portion of said wing (slot).

3. A wing having a spanwise edge portion; a first flap mounted adjacent to a lower surface of said spanwise portion in a retracted position and adapted to be moved in a chordwise direction and downwardly to an extended position increaseing the chord and camber of said wings; means to move said flap comprising:
   a. mechanical means extending in an approximately spanwise direction and in a low drag disposition when said flap is in said retracted position;
   b. powered means to rotate said mechanical means to a downwardly position in which said mechanical means are approximately in a chordwise plane supporting said flap in said extended position, with said mechanical means being rotated about an axis of articulation located in a plane which is approximately chordwise and inclined at a large angle to said wing.

4. The structure of claim 3 in which said mechanical means comprise bellcrank means having a first end away from said axis of articulation, with link means connecting said first end with a said flap, and with the long dimension of said bellcrank being disposed in an approximately spanwise direction when said flap is in said retracted position.

5. The structure of claim 3 in which: a. said mechanical means have an end located away from said axis of articulation; b. door means are provided fairing said flap to said wing in said retracted position, c. link means are provided connecting said mechanical means to said door means causing said door means to open to permit emergence of said flap from said retracted position, d. said link means being adapted to rotate from a generally chordwise orientation when said door is open, to an approximately spanwise orientation when said door is closed.

6. The structure of claim 3 in which a. a second flap is mounted approximately above said first flap; b. said mechanical means having arm means extending across said axis of articulation. c. link means connecting said arm means to a rear portion of said second flap. d. with said link means connected to said arm means moving upwards to elevate the rear portion of said second flap as said mechanical means move downwards to extend said first flap.

* * * * *